No. 655,043. Patented July 31, 1900.
N. ASBELL.
CANE STRIPPER.
(Application filed Feb. 13, 1900.)
(No Model.)
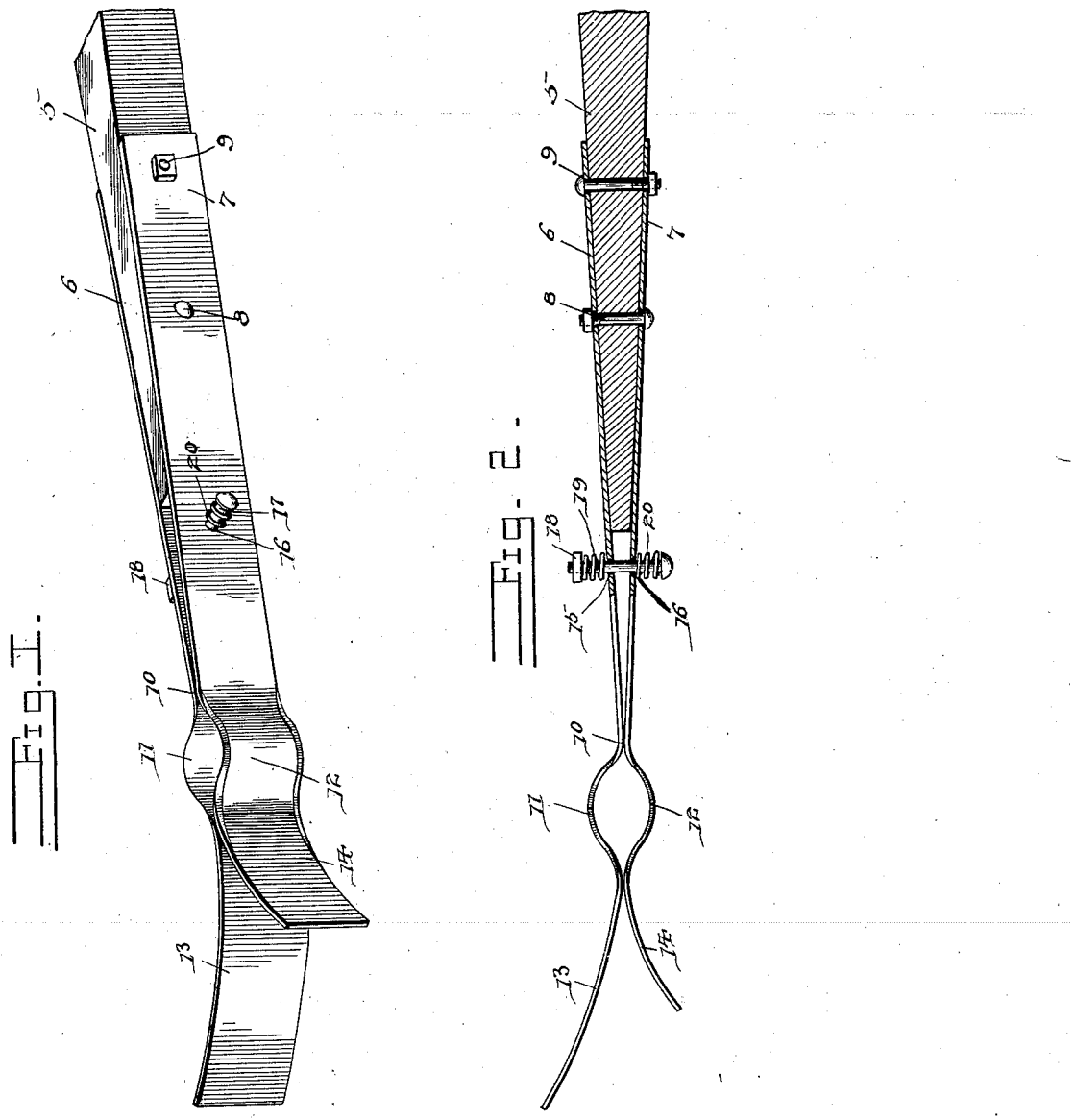
Noah Asbell, Inventor
Witnesses
F. E. Alden.
Geo. F. Chandler.
By his Attorneys,
C. A. Snow & Co.

UNITED STATES PATENT OFFICE.

NOAH ASBELL, OF THOMASVILLE, GEORGIA, ASSIGNOR OF ONE-HALF TO WILLIAM HOWZE, OF CAIRO, GEORGIA.

CANE-STRIPPER.

SPECIFICATION forming part of Letters Patent No. 655,043, dated July 31, 1900.

Application filed February 13, 1900. Serial No. 5,102. (No model.)

*To all whom it may concern:*

Be it known that I, NOAH ASBELL, a citizen of the United States, residing at Thomasville, in the county of Thomas and State of Georgia, have invented a new and useful Sugar-Cane Stripper, of which the following is a specification.

This invention relates to cane-strippers; and it has for its object to provide a device for stripping the leaves from sugar-cane and in which the stripper may be applied to the stalk and withdrawn therefrom at any point of its length and which when in position may be readily operated for the purpose designed.

In the drawings forming a portion of this specification, and in which similar numerals of reference designate like and corresponding parts in both views, Figure 1 is a perspective view showing the complete stripper with a portion of the handle broken away. Fig. 2 is a central longitudinal section in a plane including both jaws of the stripper, the extremities of the jaws and the securing-bolts being shown in the elevation.

Referring now to the drawings, the stripper of the present invention comprises a tapered end portion 5, to the converging opposite faces of which are fixed plates 6 and 7, which extend beyond the extremity of the handle and are held thereon by bolts 8 and 9 or in any other suitable manner. The plates 6 and 7 are of spring metal and are similar in form, these plates lying convergingly in conformity with the faces of the handle to which they are secured, so that at a point beyond the extremity of the handle they touch, as illustrated at 10. Each plate is then bowed outwardly to form arc-shaped bows 11 and 12, the plates being again brought to touch at the outer ends of these bows, after which they are curved outwardly in opposite directions, as shown at 13 and 14, the portion 13 being continued to a greater extent than the portion 14.

To assist the elasticity of the plates in holding the portions at the ends of the bows in mutual contact, alining perforations 15 and 16 are formed in the plates, and through these perforations is passed a headed bolt 17, provided with a nut 18, said head and nut being disposed to lie beyond the outer faces of the plates 7 and 6, respectively. A helical spring 19 encircles the bolt 17 and lies with its ends against the nut 18 and plate 6, while a second helical spring 20 encircles the bolt between the head 17 and the plate 7. By adjustment of the nut 18 the tensions of these springs may be increased to the proper extent, so as to reinforce the action of the spring-plate.

The opposite edges of the bowed portions 11 and 12 of the plates are sharpened to form knives, these sharpened portions being continued to a suitable distance along the portions 13 and 14, and in the manipulation of the stripper it is manipulated to receive the stalk between the portions 13 and 14 of the plates. By then pressing forwardly the plates are forced apart and the stalk moves to lie between the bows 11 and 12, after which the stripper may be moved downwardly of the stalk and will act to effectively remove or strip the leaves.

It will be understood that in practice the present device may be made of any size and materials and may have any suitable proportions and that changes in the specific structure shown may be made without departing from the spirit of the invention.

As above stated, the portion 13 is extended beyond the portion 14, and the object of this arrangement is to facilitate the application of the stripper to the stalk by permitting it to be applied with a sidewise movement as well as with a longitudinal movement.

What is claimed is—

1. As an article of manufacture, a cane-stripper consisting of a handle portion having a tapered end, and a spring-plate secured against each of the converging faces of the handle portion, each of the plates being bowed outwardly at a point beyond the extremity of the handle and then brought inwardly and touching and then curved outwardly, one of the plates extending beyond the other and the upper and lower edges of the plates being sharpened at the bowed portions of the plates.

2. As an article of manufacture, a cane-stripper consisting of a handle having a tapered end, spring-plates secured against the converging faces of the tapered portion and extending therebeyond, said plates being bowed in opposite directions beyond the end of the handle and being brought to touch at both sides of the bows, and the plates being curved away from each other beyond the bows and one extending beyond the other, said plates having alining perforations between the bows and the end of the handle, a bolt passed through the perforations and provided with a nut, and helical springs disposed upon the bolt at the outer sides of the plates, whereby the nut may be manipulated to vary the pressure between the plates.

In testimony that I claim the foregoing as my own I have hereto affixed my signature in the presence of two witnesses.

NOAH ASBELL.

Witnesses:
T. W. BROWN,
J. B. WIGHT.